March 14, 1961 P. E. OHMART 2,975,287
LOW NOISE LEVEL IONIZATION CHAMBER
Filed March 23, 1956 3 Sheets-Sheet 1

INVENTOR.
PHILIP E. OHMART
BY
WOOD, HERRON & EVANS
ATTORNEYS

March 14, 1961 P. E. OHMART 2,975,287
LOW NOISE LEVEL IONIZATION CHAMBER
Filed March 23, 1956 3 Sheets-Sheet 2
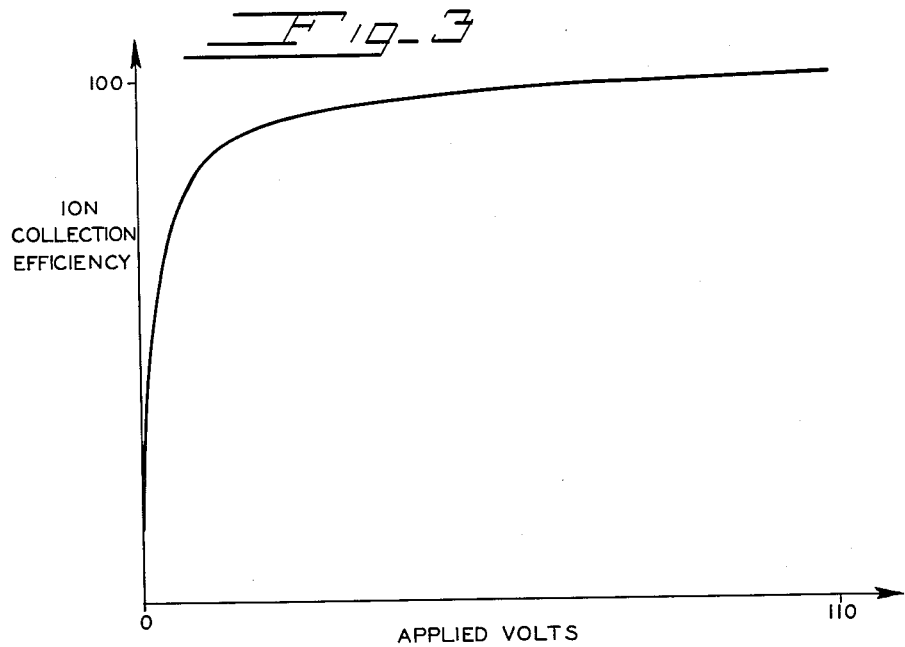
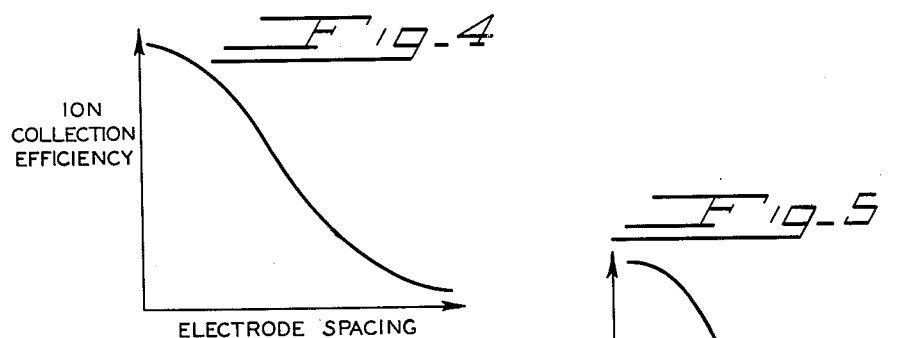
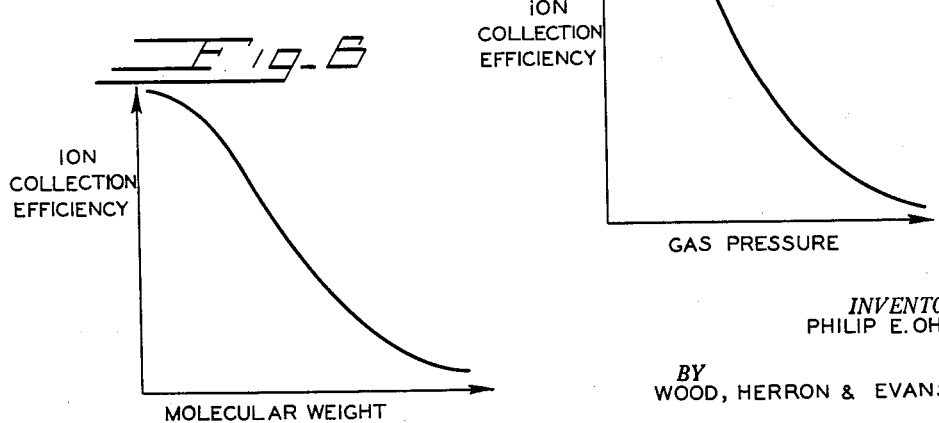
INVENTOR.
PHILIP E. OHMART
BY WOOD, HERRON & EVANS
ATTORNEYS March 14, 1961 P. E. OHMART 2,975,287
LOW NOISE LEVEL IONIZATION CHAMBER
Filed March 23, 1956 3 Sheets-Sheet 3
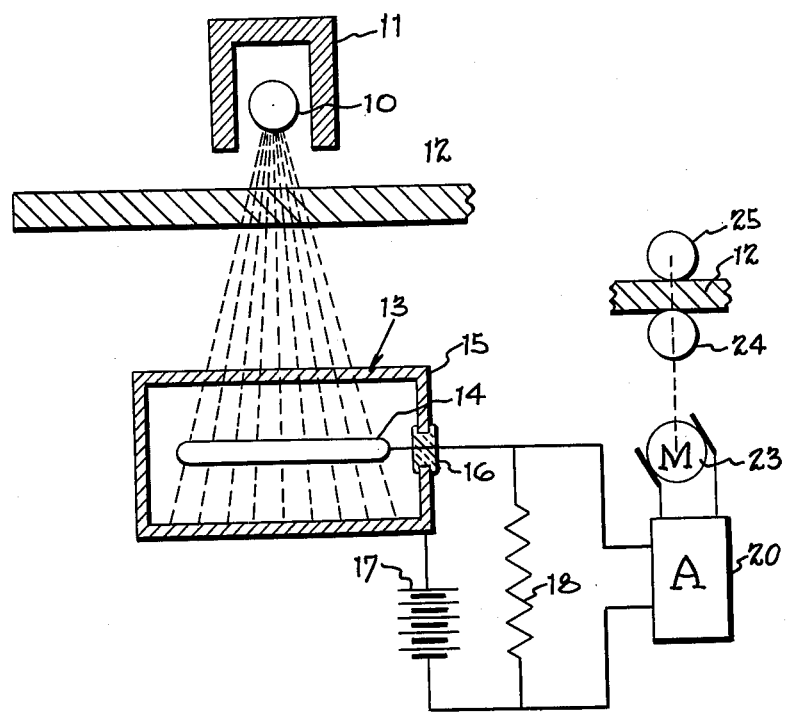
_Fig-7_
INVENTOR.
Philip E. Ohmart.
BY
Wood, Herron & Evans.
ATTORNEYS.

United States Patent Office 2,975,287
Patented Mar. 14, 1961

2,975,287

LOW NOISE LEVEL IONIZATION CHAMBER

Philip E. Ohmart, Cincinnati, Ohio, assignor to The Ohmart Corporation, Cincinnati, Ohio, a corporation of Ohio Filed Mar. 23, 1956, Ser. No. 573,557

5 Claims. (Cl. 250—83.6)

This invention relates to measuring and controlling apparatus and is particularly directed to apparatus of this type using radioactive energy and an ionization chamber for detecting that energy as it is attenuated by a variable condition.

There is at the present time a marked trend toward the use of automatic process controls and remote reading instruments for indicating the values of measurements made at points quite remote from the indicator and often inaccessible to direct measurement.

One type of measuring and control system in widespread use employs a source of radioactive energy which emits radiations, preferably beta rays, which are attenuated by a variable condition and then impinge upon an ionization chamber. This chamber functions in much the same manner as a variable resistor conducting a small current, the magnitude of which is correlated with the intensity of the impinging radiation and with the value of the variable condition.

As an example, of the manner in which an ionization chamber can be used in an installation adapted to measure and/or control a variable condition, assume that it is desired to measure the thickness of a strip of sheet material. To accomplish this, an emitter such as a quantity of radioactive cobalt is disposed on one side of the sheet and an ionization chamber is disposed upon the opposite side of the sheet so that a portion of the radiation emitted by the radioactive material passes through the sheet. The radiating beam is attenuated due to absorption by the sheet, and then impinges upon the ionization chamber where it is effective to cause a current flow through the chamber which current is adapted for use as an index of thickness or density of the sheet material.

As will readily be appreciated from the above example it is completely unnecessary for an ionization chamber to be brought into contact with the material being measured so long as the cell is arranged so that the radiation impinging upon it is attenuated by the material. Consequently, an ionization chamber can be used in many installations where the condition being measured is inaccessible to direct contact or where for some other reason contact measurements are impossible or not practical. Consequently, an ionization chamber is free from many limitations which greatly restrict the utility of other types of measuring equipment. However, the vary nature of operation of a system utilizing an ionization chamber inherently introduces a difficulty which prior to the present invention has adversely effected the performance of this type of apparatus especially where rapid response and extreme accuracy are desired.

This difficulty is due to the wide random fluctuations in the magnitude of the current generated by an ionization chamber even when operated under completely steady state conditions; that is when it is associated with a fixed source of radioactive energy and a constant value of a variable condition. Thus, while over a period of time an ionization chamber will permit a current flow which will accurately index a variable condition, the current flowing in many instances often provides a highly erroneous indication of the value of that condition.

The magnitude of these random current variations in some installations has been observed to be as high as seventy percent of the average current flowing during a given period. When the current flowing through an ionization chamber is employed to operate measuring or control apparatus, these current variations are extremely objectionable since they result in highly undesirable fluctuation of the position of the indicator or recorder needle or in the faulty actuation of a control device at a time when the variable condition does not require any corrective action by such device.

The principal object of the present invention is to provide an ionization chamber, which is especially adapted for use in a control or measuring device and is effective to conduct a current substantially free from random fluctuations so that the current always represents an accurate index of the variable condition. Consequently when such an ionization chamber is used in conjunction with apparatus for controlling a variable condition, the apparatus is actuated for corrective action only when the operation of the apparatus is required by the state of the variable condition. Similarly, if an ionization chamber of this invention is employed as a part of a measuring device, the indicator needle or recording pen remains free from objectionable fluctuation due to random variations in the current or voltage applied to the indicator.

More specifically this invention is predicated upon the empirical discovery and determination that when an ionization chamber is operated so that its ion collection efficiency is kept below approximately eighty-five percent, the chamber will conduct a current flow which is accurately correlated with the variable condition and is substantially free from undesirable random fluctuations. For the purposes of the present description, random current fluctuations not attributable to changes in the variable condition, will be referred to as "noise"; the term "noise level" will be employed to denote the relative magnitude of those random fluctuations compared to the average signal magnitude.

In order that the significance of this objective may be more fully appreciated, it is considered helpful to review briefly the general principles of ionization chamber operation and to set forth other principles and results which have been empirically determined and form the basis of the present invention. It is well recognized that, all other factors being held constant, the current which passes through an ionization chamber varies in a predetermined manner with the density of the impinging ionic energy. The ionizing energy may be obtained from radioactive material such as strontium-90, or from X-ray tubes or ultra-violet lamps. This property of an ionization chamber renders it useful for purposes other than measuring radiant intensity since by arranging a source of radiant energy and a chamber in such a manner that the density of the impinging energy is attenuated by the condition to be measured, the current passing through the chamber can be used as an index of the variable condition.

Basically, an ionization chamber comprises a housing enclosing two spaced electrodes in contact with an ionizable gas. A source of potential is connected across the electrodes and is effective to create a potential field between them. When the filling gas is ionized by the impingement of ionizing radiation or by secondary radiation, in turn caused by the ionizing energy, there will be a biased movement of the ions toward the electrodes. The positive ions move toward the negatively charged electrode where they combine with free electrons to form neutral gas molecules. Simultaneously, the negatively charged electrons move toward the positively charged electrode. The electrons which reach the negative electrode flow through an external circuit and are returned to the battery. This external circuit includes a load resistor for developing a potential which is applied to an amplifier for driving an indicating or control device. The magnitude of the current flow through the load resistor is dependent both upon the quantity of the impinging ionizing energy and the potential applied across the chamber electrodes.

In addition, there is a third factor which influences the size of the current flow; this factor is termed the "ion collection efficiency" of the chamber. To understand this factor, assume that in an ionization chamber, a given number of ions is formed by the impingement of radiating energy upon the gas molecules. If the chamber is constructed so that each of the ions which is thus formed moves under the influence of the potential field and reaches the positive electrode of the chamber while a similar number of free electrons reach the negative electrode, the chamber conducts a maximum amount of current and is said to have a 100% ion collection efficiency. If in contrast, the chamber is constructed or operated so that only a portion of the electrons liberated reach the negative electrode while the remaining electrons are neutralized by recombination with ions in the gaseous space, the chamber conducts a lesser current and is said to have an ion collection efficiency corresponding to the percentage of the ions formed and electrons freed which migrate to the positive and negative electrodes respectively.

Among the factors which influence the ion collection efficiency of a chamber are the electrodes spacing, the potential difference between the electrodes, the filling gas pressure, and the molecular weight and composition of the filling gas. The influence of these individual factors will be discussed in greater detail below in conjuction with the description of the accompying graphs. It will suffice here to state that by varying these factors, the ion collection efficiency of a chamber can readily be varied from a few percent to substantially 100%.

In the past, it has been universal practice to operate an ionization chamber at 100% efficiency to eliminate the need for a carefully regulated voltage supply. That is, it has been considered desirable to apply across the electrodes of the ionization chamber a voltage appreciably greater than that required to poduce a field having a sufficient gradient to cause substantially all of the free electrons and ions to reach their respective electrodes before recombination. Such an arrangement provides the advantage that small changes in the electrode potential do not produce corresponding changes in the current flowing through the ionization chamber, independently of changes of the impinging radiation. Operating an ionization chamber at 100% efficiency was also considered desirable since it provides a linear variation of current with changes in radiant field intensity.

The discovery which forms the basis of the present invention is that if an ionization chamber is constructed and operated at less than 85% ion collection efficiency, vastly superior performance is obtained since the noise present in the current conducted by the cell is minimized. In other words, if an ionization chamber is operated so that an appreciable number of ions formed by the impinging energy are not utilized, but rather are deliberately lost due to recombination of the positive ions and electrons elsewhere than at the positive electrode, random current fluctuations are substantially eliminated. Moreover, this highly beneficial result is accomplished without any appreciable lengthening of the response time or deleterious effect upon linearity.

This leads to the very paradoxical result that to use an ionization chamber most effectively to measure a variable condition, a portion of the minute current conducting capacity of the chamber should be purposefully wasted. This result is even more striking in view of the fact that the maximum current output of most ionization chambers is of the order of a few billionths of an ampere. Thus, it has been found that by decreasing the already minute current conductivity of a chamber by constructing or operating the chamber in an inefficient manner, it is possible to obtain much more accurate control or measurement than if the chamber is operated so that its entire current conducting capacity is utilized.

I have determined that random fluctuations in the magnitude of the current conducted by an ionization chamber can largely be attributed to similar random fluctuations in the number of ions formed within the chamber. As will readily be appreciated by those skilled in the art, even when all of the other variable conditions are held constant, the energy emitted by a radioactive source, an X-ray tube or other emitter is subject to statistical variations and is by no means a constant quantity. Moreover, the number of ions produced by a given quantity of radiant energy also varies as a probability function. Thus, the total number of ions in the filling gas of a chamber operated under steady state conditions is not constant but varies in a random fashion. It is this statistical variation in the density of the ion concentration within the chamber which manifests itself as noise.

In order to account for the substantial elimination of noise, when an ionization chamber is operated inefficiently, I have postulated that when a greater number of ions is formed that can be effectively influenced by the electrodes, the ions become unevenly distributed throughout the gaseous space surrounding the electrodes. More specifically, I have postulated that the positive ions, in their movement toward the positive electrode form a dense cloud adjacent to the surface of that electrode. As a consequence of this dense cloud, if the radiation is effective to instantaneously form a larger number of ions, the progress of these ions toward the positive electrode is impeded by the ion cloud so that despite a surge in the total number of ions and free electrons, the current conducted by the chamber increases only slightly.

Similarly, if the rate of ion formation is suddenly decreased, the positive electrode is nevertheless effective to attract practically the same number of ions from the dense cloud as before, since the number of ions in the cloud exceeds the number that can be attracted during any brief period. Of course, if the rate of impinging ionization is permanently reduced, after a short interval the density of the ion cloud is similarly decreased and the rate of ion attraction to the positive electrode and electron attraction to the negative electrode again accurately reflects the average rate of ion formation.

I have determined that by operating an ionization chamber at less than 85% ion collection efficiency, an ion cloud of sufficient density is formed so that the effects of instantaneous variations in the rate of ion formation are eliminated. I have also experimentally determined that if the rate of ion formation changes for any appreciable period after a brief interval the density of the ion cloud changes in accordance with the new rate of ion formation so that the responsiveness of the chamber to changes in the variable condition is not adversely affected. In other words, while inefficient operation of an ionization chamber results in a "smoothing out" of the statistical variations in ion formation, thereby minimizing noise, it does not adversely effect the overall responsiveness of the chamber to changes in the quantity of the impinging radiation.

It is another object of the present invention to provide a method for adjusting certain factors of ionization chamber construction so that a chamber may be operated at a predetermined ion collection efficiency. Briefly, this method involves the steps of operating a chamber at substantially 100% ion collection efficiency by impressing a sufficiently high potential across the electrodes of the chamber so that the current flow through the chamber is at a maximum value. Thereafter, one or more of the chamber construction factors such as gas pressure, electrode spacing or the like, is adjusted until the current flowing through the chamber reaches a predetermined fraction, corresponding to the predetermined value of ion collection efficiency, of the chamber's maximum current conductivity. Alternatively, after the maximum current conductivity of the chamber has been determined, the potential applied to the chamber is decreased until a predetermined fraction of the maximum current flows through the chamber. For minimum noise level this current should be below 85% of the maximum current.

These and other objects and advantages of the present invention will be more readily apparent from a further consideration of the following detailed description of the drawings illustrating a preferred embodiment of the invention.

In the drawings:

Figure 3 is a graph showing the relationship of ion collection efficiency to electrode potential or "applied volts."

Figure 4 is a graph showing the relationship between ion collection efficiency and electrode spacing.

Figure 5 is a graph showing the relationship of ion collection efficiency and gas pressure.

Figure 6 is a graph showing the manner in which ion collection efficiency varies with molecular weight of the filling gas.

Figure 7 is a diagrammatic view similar to Figure 1 of apparatus for controlling the thickness of a sheet.

Figure 1:
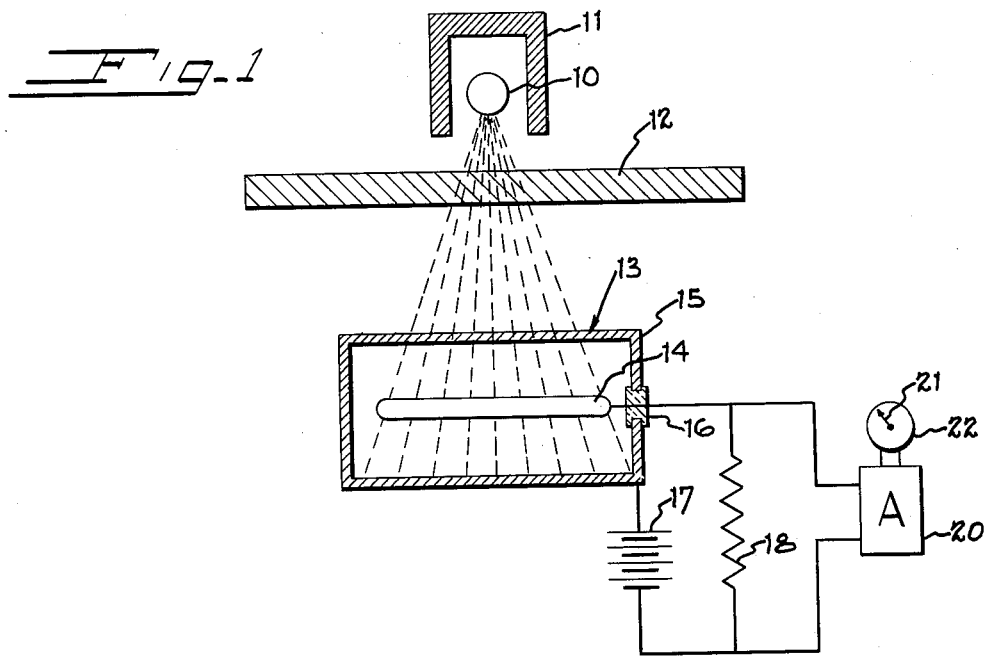
Figure 1 is a diagrammatic view of a thickness measuring gauge utilizing an ionization chamber as a detector of penetrating radiation.

Figure 1 shows a typical embodiment of a measuring device embodying an ionization chamber as a radiation detecting element. It is to be understood that this embodiment is merely illustrative and from the foregoing discussion of the general principles of the invention and the following disclosure of this particular embodiment, those skilled in the art will readily comprehend the manner in which the present invention can be employed in conjunction with other types of measuring equipment utilizing ionization chambers, for example in apparatus for measuring or controlling density, liquid level, interface level, film thickness X-ray exposure, and the like.

As shown in Figure 1 a source of radioactive energy 10 surrounded by a U-shaped shield 11 is disposed on one side of a sheet of material 12 while an ionization chamber 13 is disposed on the opposite side of the sheet in the path of the ionizing radiations emitted by source 10. As explained below, the ionization chamber produces an electrical signal in the form of a current passing through the chamber, which varies in accordance with the thickness of the sheet 12. It is to be understood that an X-ray tube or other source penetrating radiation can be substituted for radioactive source 10 without changing the manner of operation of the device. In the embodiment shown, the strip of material absorbs a portion of the radiation emitted by source 10 thereby attenuating the amount of radiation impinging upon ionization chamber 13. As the thickness of strip 12 increases, the amount of radiation which is absorbed by the sheet also increases; and consequently the amount of radiation impinging upon chamber 13 decreases. Conversely, as the thickness of the sheet decreases, a larger amount of radiation penetrates the sheet and impinges upon the chamber. The ionization chamber functions much like a variable resistor allowing a current to flow through it at a rate which varies in accordance with the intensity of the impinging radiation. This current is therefore adapted for use as an index of the thickness of the sheet.

The exact structural details of ionization chambers are well known in the art and constitute no part of the present invention. In general, an ionization chamber comprises a pair of electrodes enclosed in a radiation permeable housing which contains a suitable filling gas, for example, oxygen, nitrogen, argon or a mixture of these. In the particular form shown, ionization chamber 13 includes a collector electrode 14 in the form of a rod disposed centrally within housing 15. The housing also functions as the negative electrode of the chamber. Connection is made to inner electrode 14 through a suitable air tight seal such as glass to Kovar seal 16. A potential is applied between electrodes 14 and 15 of the ionization chamber by means of a battery, or other source of constant D.C. voltage 17. The positive terminal of the battery is connected to housing 15, while the other terminal is connected to one end of load resistor 18, the opposite end of the load resistor in turn being connected to central electrode 14 of the ionization chamber.

Any suitable form of amplifier 20 is connected across load resistor 18. The output of this amplifier may be used to drive a meter or recorder for providing a visual indication of the thickness of sheet 12; or alternatively the amplifier output can be used to operate suitable electrically responsive processing equipment such as a motor, burner or the like. Figure 7 illustrates an installation in which the output of amplifier 20 is used to drive control apparatus for modifying the thickness of the sheet. As there shown the output leads of amplifier 20 are connected to a motor 23 which in turn mechanically positions rollers 24 and 25 effective to flatten sheet 12. The exact details of the indicating or control apparatus are of no concern in the present application, the only important consideration being that the current flow through the ionization chamber, and hence through load resistor 18 is used either directly or indirectly to operate a device for indicating or controlling the thickness of sheet 12.

According to the present invention the ionization chamber is constructed and operated at less than 85% ion collection efficiency so that the fluctuations in the current conducted by the chamber are minimized and needle 21 of the meter 22 is effective to provide a steady indication of the actual thickness of strip 12. The exact manner of construction and operation of the chamber to provide this result are explained in detail below in connection with the description of Figures 2 through 6 showing the relationship of several variable factors associated with the chamber. It is to be understood that in these figures the effect of variation in only one fact at a time is considered, the remaining factors being held constant.

Figure 2:
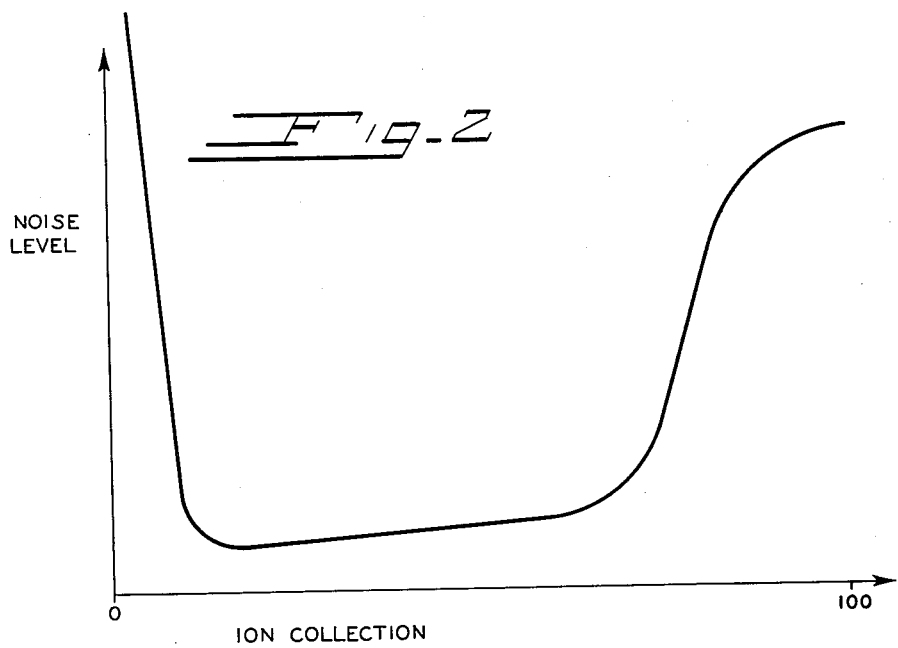
Figure 2 is a graph showing the relationship of noise level to ion collection efficiency.

Figure 2 is a graph showing the relationship of noise level with the ion collection efficiency of an ionization chamber. From this graph it can be seen that if a chamber is constructed and operated at an ion collection efficiency of near zero, the noise level of the system is exceedingly large since the ions formed within the chamber move at random. However, as the ion collection efficiency increases, the noise level rapidly drops off, reaching a minimum value at an ion collection efficiency of approximately 10%. From this minimum value the noise level rises only slightly as the ion collection efficiency increases to a value of approximately 85%. In this range, from approximately 10 to 85%, the potential applied to the electrodes creates a field having a gradient sufficiently high to cause a biased movement of the positive ions and electrons so that a substantial number reach their respective electrodes before recombination. However the field is not so strong that it causes all of the electrons to reach the negative electrode or all of the positive ions to reach the positive electrode before the electrons and ions recombine in the gaseous space to form neutral molecules.

In accordance with the theory disclosed above, it is postulated that the moving postive ions become relatively compacted in the vicinity of the postive electrode, forming a dense ion cloud. The positive electrode is ineffective to instantly attract all the ions constituting this cloud. Therefore, if the rate of ion formation in the gaseous space is instantaneously increased due to a random variation in radiant intensity, the progress of additional ions towards the positive electrode is impeded by the cloud and the number of the ions actually reaching the electrode is not appreciably altered.

Similarly, should there be a sudden decrease in the number of ions formed, the dense cloud will continue to supply substantially the same number of ions to the electrode, at least for a brief period. Thus during any minute period, changes in radiant intensity will not cause random current fluctuations, or "noise," but rather the current flowing through the ionization chamber will reflect the average rate of ion formation. Of course, if the radiant intensity is increased or decreased for any appreciable period, it will cause the ion cloud to become more or less dense, and consequently the current flowing through the chamber will be altered to a value which again accurately reflects the intensity of the impinging radiation. This response time of the chamber is still extremely rapid compared to installations in which capacitors and the like are employed to smooth out random fluctuations.

If the cell is operated at an ion collection efficiency of above approximately eighty-five percent, the noise level rapidly rises until, at approximately one hundred percent ion collection efficiency, it has a value many times in excess of its minimum value. In accordance with the cell operation explained above, this rise in noise level is due to the fact that at an extremely high ion collection efficiency the ions are attracted to the electrode almost as rapidly as they are formed, and there is no dense ion cloud adjacent to the positive electrode to supply additional ions or impede ion flow, thereby stabilizing the current magnitude.

Each of the remaining graphs shows the effect of one variable, or parameter, upon which the ion collection efficiency of a chamber depends. Thus, for example Figure 3 shows the manner in which ion collection efficiency varies with the voltage applied across the ionization chamber electrodes. As there shown, when a very small voltage is applied to the electrodes, creating a field of low potential radiant, the chamber has a low ion collection efficiency, since the accelerating force exerted by the field is not great enough to attract a large proportion of the ions and electrons to their respective electrodes before the ions and electrons recombine in the gaseous space. As the voltage is increased, the ion collection efficiency rapidly increases and then asymptotically approaches 100%. In the particular chamber tested, no significant change in the ion collection efficiency was observed for voltages greater than 110 volts. It will of course be appreciated that the voltage required to produce a given ion collection efficiency varies from chamber to chamber since the potential gradient produced by a given applied voltage is also a function of the spacing and configuration of the electrodes.

Figure 4 shows the manner in which ion collection efficiency varies with electrode spacing. As there shown, the ion collection efficiency of the chamber is maximum when the electrodes are closely spaced. This is due to the fact that there are fewer ions in the plasma to be influenced by the electrodes; and furthermore, the potential field established between the electrode has a larger gradient when the electrodes are closely spaced. Consequently, the field is effective to cause substantially all of the ions to reach the positive electrode and the electrons to reach the negative electrode before they recombine in the gaseous space. As the electrode spacing is increased however, the effectiveness of the electrodes to influence all of the ions diminishes, and consequently the ion collection efficiency decreases. This efficiency continues to decrease as the electrodes are spaced further and further apart, and asymptotically approaches zero for large values of electrode spacing.

Figure 5 shows the effect of gas pressure on ion collection efficiency. It will be appreciated that since the remaining factors are held constant, the number of molecules in the housing is determined by the gas pressure. Consequently, for very low gas pressures, there are relatively few ions produced by the impinging radiation and no cloud is formed to impede the progress of these ions toward the positive electrode, nor are there as many electrons freed with which the ions may effect a recombination. Therefore, for low gas pressures substantially all of the ions and free electrons are attracted to their respective electrodes, and the chamber has a maximum ion collection efficiency. As the gas pressure is increased, however, the number of molecules available for ionization similarly increases and, at least in the presence of a sufficient quantity or radioactivity an ion cloud is formed as previously described so that the ion collection efficiency of the chamber decreases.

Figure 6 shows the variation of ion collection efficiency with the molecular weight of the filling gas. It is apparent from this figure that ion collection efficiency of a chamber is highest for gases of low molecular weight such as hydrogen and helium, and decreases with increase in the molecular weight of the filling gas. It is the greater mobility of the light ions, which results in their rapid movement toward the electrodes, that at least largely accounts for the fact that under equal conditions more ions of a light gas will be neutralized at the positive electrode than is the case with a heavier gas. It is to be understood that characteristics other than the molecular weight of the filling gas also influence the ion collection efficiency of a chamber. There characteristics include the ionizing potential of the gas and its tendency to form both negative and positive ions as opposed to the formations of positive ions and free electrons. These two characteristics of the filling gas will not be considered in detail here, but it generally can be stated that the ion collection efficiency of a chamber decreases with increases in the ionizing potential of the filling gas and is also lower for a gas forming negative ions than it is for a gas in which such ions are not formed.

If a well regulated voltage supply is available, the easiest of the above described factors to vary is the potential applied to the electrodes. Since this factor can readily be adjusted in the field as well as in the manufacturer's plant it is in most installations the one to be varied. In order to operate the chamber at a predetermined ion collection efficiency by varying the electrode potential, the chamber is first opertaed at a relatively high potential at which the chamber conducts a maximum current. This current can be measured by connecting any conventional instrument in circuit with the chamber electrodes and increasing the potential across the electrodes until the current ceases to increase. Thereafter, the potential applied to the electrodes is decreased until the chamber conducts a current bearing the same relationship to the maximum current as the percent ion collection efficiency desired.

The second most easily varied factor is the gas pressure and I shall now describe a method of constructing a chamber so that it has a predetermined ion collection efficiency by varying this factor. In accordance with this method, a chamber is constructed in any suitable manner and is filled with gas, at a predetermined pressure. Then a current measuring instrument and a voltage source are connected to the electrodes of the chamber and the chamber exposed to a predetermined quantity of radiant energy. The potential is increased until the current passing through the chamber reaches a maximum value. The pressure of the filling gas is then adjusted until the current output of the cell equals a predetermined fraction of the maximum current. It is not considered necessary here to describe in detail specific means for changing the gas pressure, since these are well known in the art. In general, however, one suitable manner involves the provision of a check valve communicating with the interior of the chamber housing, the check valve being provided with a coupling by means of which it can be attached to a pump for forcing additional gas into the housing thereby increasing the pressure. If necessary, the check valve can also be actuated to allow gas to escape thereby lowering the pressure within the housing.

Alternatively, instead of adjusting gas pressure, the electrode spacing may be adjusted or the composition of the filling gas may be changed. In any case however, the ion collection efficiency of the chamber may be determined by comparing the current conducted by the chamber with the maximum current which the chamber is capable of conducting. Also, no matter which variable factor is regulated, the ion collection efficiency of the chamber should be between 10 and 85% to provide a system having an extremely low noise level.

In order that the significance of providing a measuring system having a minimum noise level may be fully appreciated, a typical installation similar to that shown in Figure 1 will be discussed. Suppose that with apparatus arranged as shown in Figure 1 it is desired to measure the thickness of a strip of material with a precision of plus or minus one percent. The current conducted by an ionization chamber when employed to index this quantity is approximately $3 \times 10^{-10}$ amperes, and the full scale needle deflection of the measuring instrument is equal to $3 \times 10^{-11}$ amperes. Hence, in order to measure the thickness of the strip of material with the desired precision, the current must be measured to within $3 \times 10^{-13}$ amperes, and the noise level of the chamber must therefore be kept below one tenth of one percent. The following table gives specific values for the ion utilization efficiency and noise level of a particular ionization chamber adapted for use in such a measuring device.

| Ion Collection Efficiency | Relative Noise |
| --- | --- |
| Percent | Percent |
| 37.7 | ±.05 |
| 50.0 | ±.06 |
| 56.0 | ±.15 |
| 60.0 | ±.25 |
| 64.7 | ±.30 |
| 68.2 | ±.35 |
| 72.5 | ±.30 |
| 76.8 | ±.35 |
| 80.5 | ±.40 |
| 83.3 | ±.45 |
| 85.5 | ±.55 |
| 89.5 | ±.75 |
| 93.0 | ±.10 |

It is apparent that in order to make measurements with the desired precision using this particular arrangement, the system has to be operated at an ion utilization efficiency of approximately fifty percent or less. In order to do this the chamber is adjusted prior to use as explained above or the electrode potential is varied to secure the desired result.

Having described my invention, I claim:

1. A system for controlling the value of a variable condition of a material, said system comprising an ion chamber, a source of potential connected to the electrodes of said ion chamber, apparatus in circuit connection with said ion chamber for affecting the variable condition in response to the current conducted by said ion chamber, a source of ionizing radiant energy, said source of radiant energy and said ion chamber being disposed relative to said material whereby the intensity of the radiation impinging upon said ion chamber is attenuated by said material in accordance with the value of the variable condition, the potential applied to said ion chamber electrodes and the ion chamber construction being such that the ion chamber is effective to conduct a continuous current flow in response to the impingement of said radiation and the ion collection efficiency of the ion chamber is below eighty-five percent, said potential being less than the potential at which gas multiplication occurs within said ion chamber, whereby said ion chamber conducts a continuous current, the magnitude of which is correlated with the value of the variable condition and the noise to signal ratio of said current is minimized.

2. A system for measuring the value of a variable condition of a material, said system comprising an ion chamber, a source of potential connected to the electrodes of said ion chamber, means for indicating the value of the variable condition in response to the current conducted by the ion chamber, a source of ionizing radiant energy, said source of ionizing radiant energy and said ion chamber being disposed relative to said material whereby the intensity of the radiation impinging upon said ion chamber is attenuated by said material in accordance with the value of the variable condition, the potential applied to said ion chamber electrodes and the ion chamber being such that the chamber is effective to conduct a continuous current flow in response to the impingement of said radiation and the ion collection efficiency of said ion chamber is below eighty-five percent, said potential being less than the potential at which gas multiplication occurs within said ion chamber, whereby said ion chamber conducts a continuous current, the magnitude of which is correlated with the value of the variable condition and the noise to signal ratio of said current is minimized.

3. In a system for producing a current flow correlated with the value of a variable condition of a material, the combination of an ion chamber, a source of potential connected to said ion chamber, a device operated in response to the current conducted by said ion chamber, a source of ionizing radiant energy, said source of ionizing radiant energy and said ion chamber being disposed relative to said material whereby the intensity of the radiation impinging upon said ion chamber is attenuated by said material in accordance with the value of the variable condition, the potential applied to said ion chamber and the ion chamber construction being such that the chamber is effective to conduct a continuous current flow in response to the impingement of said radiation and the ion collection efficiency of said ion chamber is below eighty-five percent, said potential being less than the potential at which gas multiplication occurs within said ion chamber, whereby said ion chamber conducts a continuous current, the magnitude of which is correlated with the value of the variable condition and the noise to signal ratio of said current is minimized.

4. A system for controlling the value of a variable condition of a material, said system comprising an ion chamber, a source of potential connected to the electrodes of said ion chamber, apparatus in circuit connection with said ion chamber for affecting the variable condition in response to the current conducted by said ion chamber, a source of ionizing radiant energy, said source of radiant energy and said ion chamber being disposed relative to said material whereby the intensity of the radiation impinging upon said ion chamber is attenuated by said material in accordance with the value of the variable condition, the potential applied to said ion chamber electrodes and the ion chamber construction being such that the ion chamber is effective to conduct a continuous current flow in response to the impingement of said radiation and the ion collection efficiency of the ion chamber is above ten percent and below eighty-five percent, said potential being less than the potential at which gas multiplication occurs within said ion chamber, whereby said ion chamber conducts a continuous current, the magnitude of which is correlated with the value of the variable condition and the noise to signal ratio of said current is minimized.

5. A system for measuring the value of a variable condition of a material, said system comprising an ion chamber, a source of potential connected to the electrodes of said ion chamber, means for indicating the value of the variable condition in response to the current conducted by the ion chamber, a source of ionizing radiant energy, said source of ionizing radiant energy and said ion chamber being disposed relative to said material whereby the intensity of the radiation impinging upon said ion chamber is attenuated by said material in accordance with the value of the variable condition, the potential applied to said ion chamber electrodes and the ion chamber being such that the chamber is effective to conduct a continuous current flow in response to the impingement of said radiation and the ion collection efficiency of said ion chamber is greater than ten percent and below eighty-five percent, said potential being less than the potential at which gas multiplication occurs within said ion chamber, whereby said ion chamber conducts a continuous current, the magnitude of which is correlated with the value of the variable condition and the noise to signal ratio of said current is minimized.

References Cited in the file of this patent

UNITED STATES PATENTS

| | | |
|---|---|---|
| 2,397,071 | Hare | Mar. 19, 1946 |
| 2,793,345 | Hags | May 21, 1957 |

OTHER REFERENCES

A New Use for X-rays in Industry, Woods et al., Electronics, April 1941, pages 29–31, 90 and 91.

Electron and Nuclear Counters by Korff, D. Van Nostrand Co., Inc., New York, 1946, pages 116 to 118.